Oct. 26, 1926.

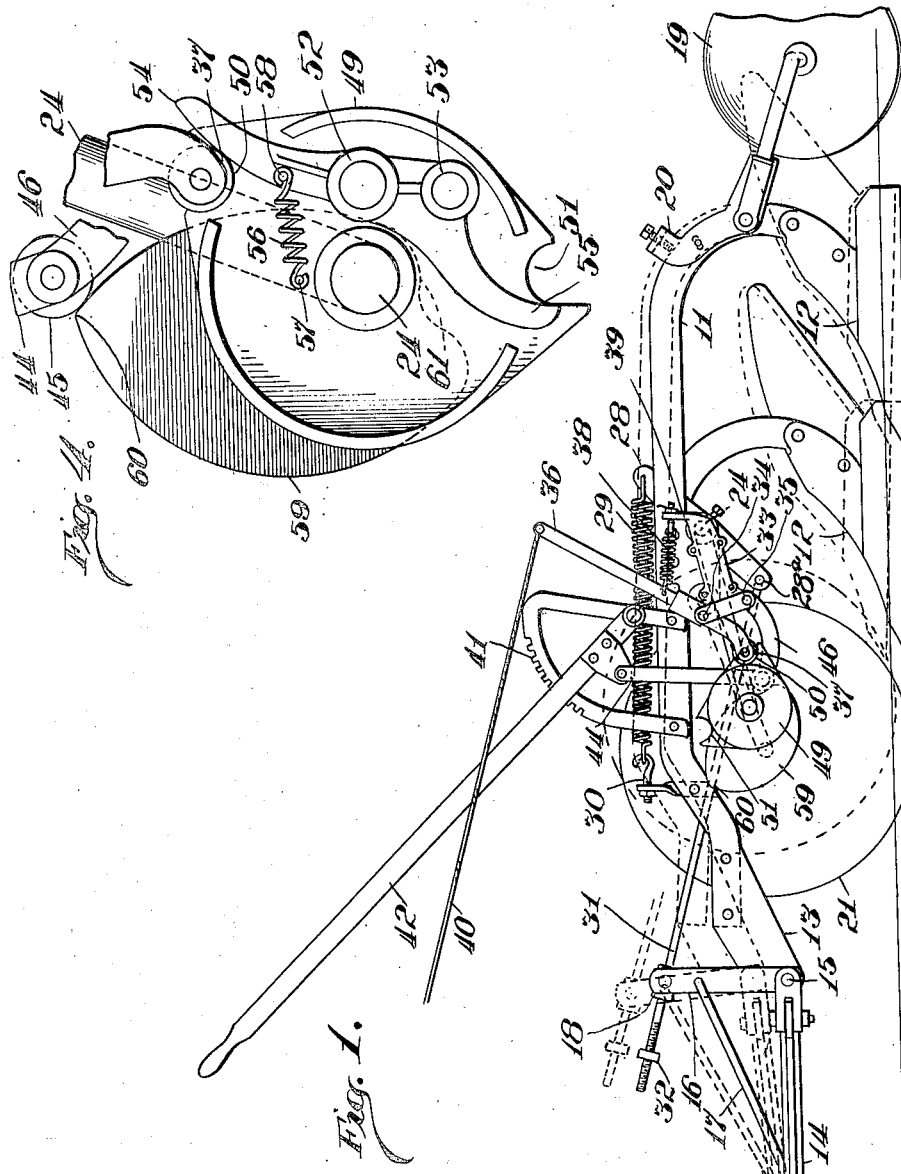

R. C. CAUGHEY

PLOW LIFT

Filed Feb. 6, 1919

Inventor
Robert C. Caughey
Offield Towle Graves
Attorneys

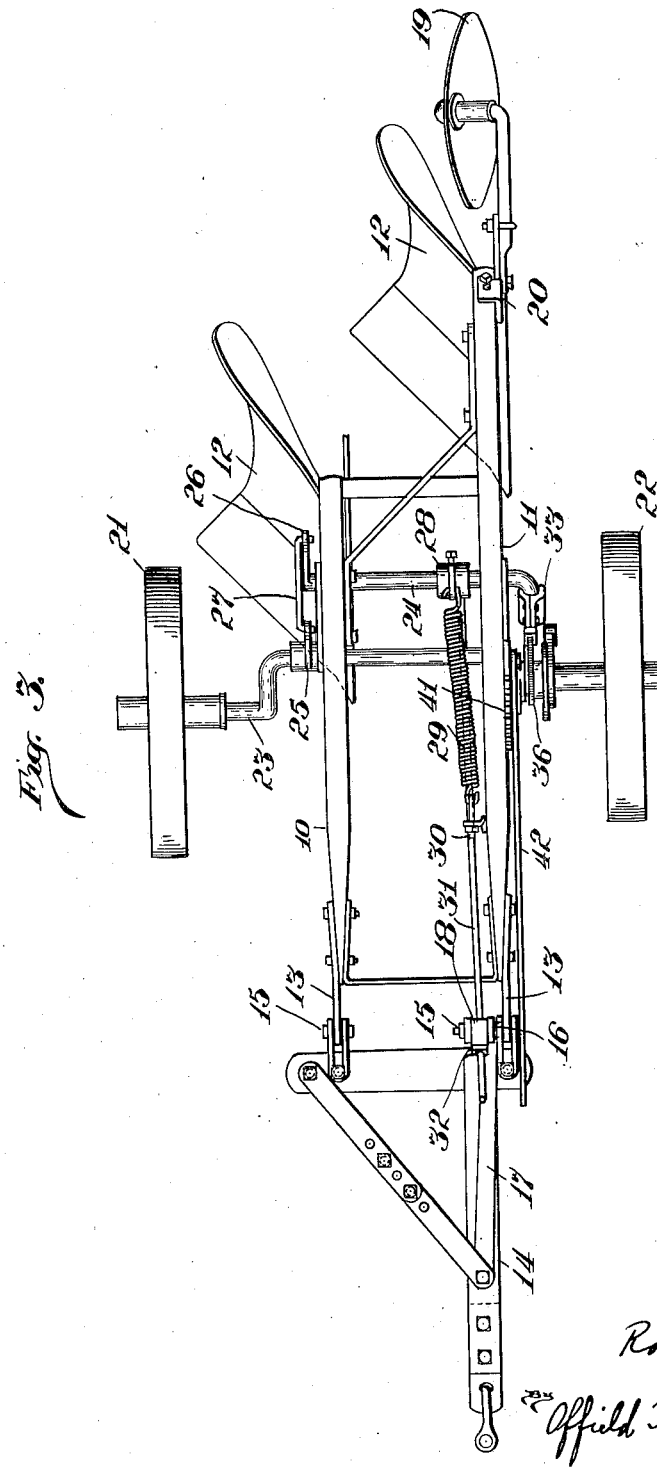

Patented Oct. 26, 1926.

1,604,338

UNITED STATES PATENT OFFICE.

ROBERT C. CAUGHEY, OF DIXON, ILLINOIS, ASSIGNOR, BY MESNE ASSIGNMENTS, TO J. I. CASE THRESHING MACHINE COMPANY, OF RACINE, WISCONSIN, A CORPORATION OF WISCONSIN.

PLOW LIFT.

Application filed February 6, 1919. Serial No. 275,284.

This invention relates to agricultural implements of the power lift type adapted to be drawn by a tractor, and one of the principal objects of the invention is to provide a flexible connection between the tractor and the implement, so that the latter will have free action to follow uneven surfaces. Another object of the invention is to provide means whereby the cutting elements of the implement can be raised from the ground by first inclining them upwardly and then by bodily raising them so that they will be entirely free from the ground when the implement is turned in the field or in moving it from one field to another. Other objects will appear hereinafter. The invention consists in the novel construction, combination, and arrangement of parts.

In the accompanying drawings—

Fig. 1 is a side elevation showing a plow constructed in accordance with the principles of this invention, with the cutting elements a short distance below the ground;

Fig. 3 is a plan view; and

Figs. 4 and 5 show details of the power operating mechanism.

Figure 5:
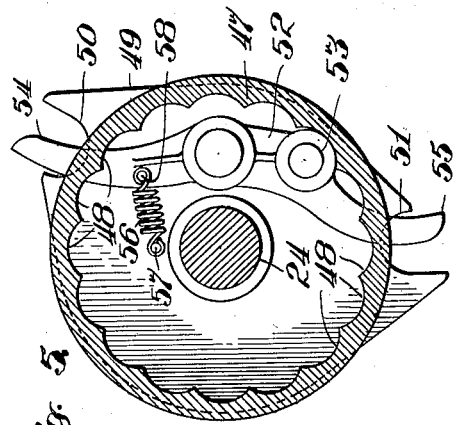

It has been found that if there is a rigid connection between the hitch-bar and the frame of an implement of this type, it will not have a free action to follow uneven surfaces, for when the connection is rigid from the tractor, the plow has to oscillate on the two main wheels, and if there is a wheel at the rear it tends to cause the plows to run out when striking uneven ground. In the present invention, the hitch-bar is pivotally connected to the frame, which allows the frame to be supported upon three wheels, and the principal feature of the invention is the means by which, in raising the plows from the ground, the frame is first inclined upwardly to cause the plows to run out of the ground, and thereupon a truss connection is placed in operation which straightens out the bend between the hitch-bar and the frame and bodily elevates the rear of the frame.

Referring now more particularly to the drawings, the frame comprises beams 10 and 11, at the rear of which are plow bodies 12, and having plates 13 at the forward ends. A rigid hitch-bar 14 is pivotally connected to the plates 13 by means of pins 15, and projecting upwardly from the end of the hitch-bar adjacent the frame is a post 16 supported by a brace-rod 17, with a perforated swivel-block 18 at the upper end of the post.

At the rear of one of the beams 11 is a ground wheel 19 which is provided with an adjustable connection 20 for varying the height of the wheels with respect to the plow bodies. At the sides of the frame in front of the plows is a furrow wheel 21 and a power or land wheel 22. The furrow wheel is mounted on a shaft 23 in the form of a crank, and the power wheel 22 is also mounted in the frame on a shaft 24 in the form of a crank. The portions of these shafts which are mounted in the frame are provided with arms 25 and 26, respectively, at one side of the frame, which are connected by means of a link 27 so that the crank portions of the shafts, that is, the parts upon which the wheels are mounted, will both be rotated together.

Figure 2:
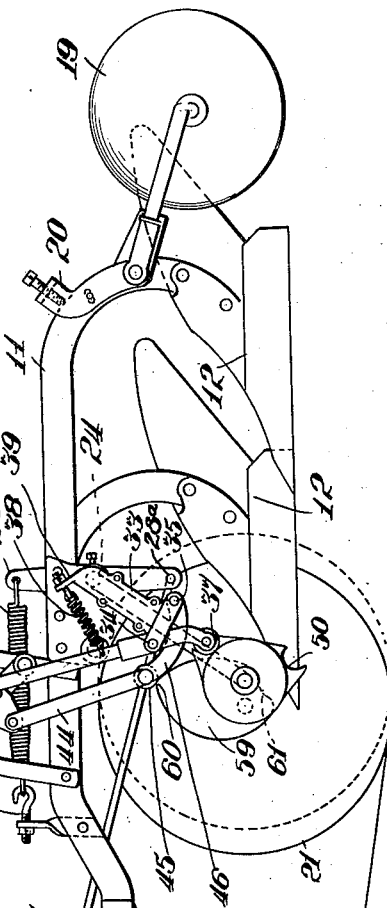
Fig. 2 is a side elevation showing the elevated position of the parts.

Secured to the shaft 24 is an upstanding arm 28, the upper end of which is connected by means of a close coiled spring 29 to a turnbuckle 30 supported by the frame. Said spring serves to assist the lifting mechanism when the plow bodies are being raised, and to cushion the same when dropped. The arm 28 has a depending extension 28ᵃ to which is secured a truss-rod 31 which extends through the perforation of the swivel block 18 and is provided with an adjustable nut 32 on this end of the rod, which is threaded, so that when the plow is in the lowered or operating position, as shown in Fig. 1, the truss-rod 31 can be moved a considerable distance before the nut 32 will be brought in contact with the swivel block 18, as shown in Fig. 2.

Bolted or otherwise secured to the crank arm of the shaft 24, which carries the power wheel 22, is a casing 33 which carries pivoting pins 34 and 35. Pivoted on the pin 34 is an operating lever 36 which carries an antifriction roller at its lower end and is connected by means of a spring 38 with a fixed projection 39 from the casing 33. The operation of this lever is manually controlled from the tractor, or any other suitable position, by means of a rope or cord 40 attached to the upper end of the lever. Attached to the beam 11 is a toothed sector 41 in which a hand-lever 42 is pivoted with a spring-pressed dog 43 for engaging any one of the teeth. Connected to the lever is a bar 44 which carries a roller 45 at its lower end, and a link 46 connects the lower end of the bar 44 with the pivot pin 35. The movement of the lever 42 over the sector 41 therefore raises and lowers the crank portion of the shaft 24, because of the connection through the arm 44 and assuming of course that the roller 45 is fixed with reference to the lower end of the crank axle 24. This mechanism is for adjusting the depth of cut of the plow bodies.

Attached to rotate with the power wheel 22 is a clutch member 47, as shown more clearly in Fig. 5, having a peripheral flange of which the inner surface is formed with a succession of circular depressions 48. Adjacent the clutch member 47, but freely mounted upon the crank pin portion of the power wheel supporting shaft 24, is a cooperating clutch member 49 which is formed with semicircular peripheral depressions 50 and 51 in which the roller 37 of the operating lever 36 is adapted to engage. Pivoted on this member 49 is a clutch dog 52 which has a roll 53 adapted to engage the circular depressions 48 of the other clutch member 47, and has extremities 54 and 55 which are disposed adjacent the peripheral depressions 50 and 51. A spring 56 is connected between the pin 57 attached to clutch member 49 and pin 58 on the clutch dog and tends to draw the stud 53 into engagement with the depressions 48 of the adjacent clutch member. However, the engagement of the roller 37 in either one or the other of the depressions 50 and 51 presses the clutch dog 52 out of engagement with the depressions 48 against the tension of the spring 56, so that it is only when the operating lever 36 is swung out of engagement with one of the extremities of the clutch dog and out of one of the recesses 50 or 51, that the two clutch members 49 and 47 are connected together, and as soon as the rotation of the power wheel 22 rotates the clutch members so that the roller 37 engages in the other depression 50 or 51, the clutch dog is thrown out of engagement.

Also attached to the clutch member 49, which is normally free from engagement with the power wheel 22, is a cam 59 which engages the roller 45 carried by the arm 44. This cam has a high portion 60 and a low portion 61, and when the cam is rotated so that the roller 45 engages the low portion 61, as shown in Fig. 1, the plow frame is lowered with respect to the wheels. When the high portion of the cam is engaged, as shown in Fig. 2, the frame is raised with respect to the wheels, and the engagement of the roller 37 with one of the depressions 50 of the clutch member 49 corresponds to one position of the cam 59, while the engagement of the roller with the other depression 51 corresponds to the other position of the cam.

It will be observed that in the raising and lowering action of the frame, the power wheel 22, and likewise the furrow wheel 21, are rotated upon that portion of their cranks 24 and 23, respectively, which are mounted in the frame. The rotation of the arm 28ª, which is attached to the shaft 24 of the power wheel 22, causes the truss-rod 31 to slide through the swivel block 18.

In operation, assuming that the plow bodies are adjusted to make a predetermined depth of cut, as shown in Fig. 1, the desired action at the end of a furrow or in moving the implement from one field to another is to withdraw the cutting elements from the ground and to raise them sufficiently high so that there will be no danger of their contacting with the ground. The operating lever 36 is therefore pulled forward from the position shown in Fig. 1 by means of the cord 40. This disengages the roller 37 from the recess 50 in the clutch member 49 and allows the clutch dog 52 to engage the other clutch member 47 so that the power wheel will rotate both the clutch member 49 and cam 59. The rotation of cam 59 engaging the roller 45 raises the front end of the frame with respect to the ground wheel 22 and inclines the front end of the frame upwardly, which is permitted because of the pivotal connection between the front end of the frame and the hitch-bar 14, until these parts take the broken outline position shown in Fig. 1. This raising action of the front end of the frame continues until the crank shaft 24 of the power wheel 22 is sufficiently rotated in the frame to move the arm 28ª and the truss-rod 31 attached thereto sufficiently to engage the nut 32 with the swivel block 18. This of course stops the pivotal action between the frame and the hitch-bar and the inclination of the front end of the frame is thereupon stopped. This inclination, however, is sufficient to incline the plow bodies upwardly which assists in moving them out of the ground as the implement is drawn forwardly. The continued rotation of the power wheel after the truss-rod 31 is engaged by the swivel block 18 thereupon causes the truss connection to be tightened, straightening out the bent connection between the front of the frame and the hitch-bar 14 so that the rear of the frame is thereupon swung upwardly until it assumes the full line position shown in Fig. 2. Of course as soon as the roller 37 of the operating lever 36 engages in the other notch 51 of the clutch member 49, the raising action is concluded, the clutch dog 52 is locked out of engagement with the clutch member 47, and the high portion 60 of the cam 59 is in engagement with the roller 45, as clearly shown in Fig. 2.

With the parts arranged as described and illustrated, the raising of the parts up to the time the nut 32 comes into engagement with the swivel block 18 results in a high elevation of the front end of the plow frame and the rear end of the hitch bar 14, thereby raising the forward portion of the front plow body to substantially its final point of elevation with a sharp rearward slope downwardly of the plow body, which facilitates rapid withdrawal of the plows from the ground as the implement moves forward. After this initial raising, when the nut 32 engages the swivel block 18, the crank arm of the shaft 24 and also the crank arm of the shaft 23 are nearing the vertical position and the lifting of the frame, as a whole, is not as pronounced as in the first part of the lifting operation. However, the abutment of the nut 32 against the swivel block 18, and the connection of the rod 31 with the depending arm 28ª effects the result that further rearward movement of the crank arms of the shafts 23 and 24 throws the rear end of the plow frame upwardly to lift the plow bodies and the rear ground wheel 19 entirely free from the ground, a slight depression of the forward end of the plow frame being effected at the same time so that the final lifting results not only from a little further elevation of the frame at the point of connection of the shafts 23 and 24 therewith, but also forward tilting of the frame. This enables a higher elevation of the front portion of the plow bodies to be effected in the first part of the raising operation and enables the final raising to be more readily accomplished.

To return the implement to the plowing position, the operating lever 36 is pulled forwardly against the tension of its spring 38 from the position as shown in Fig. 2, which releases the clutch dog as before, causes the engagement of the clutch, rotates the cam 59 so that the low portion thereof is engaged by the roller 45, and in the movement of the roller 45 from the high to the low portion of the cam, the crank shaft 24 of the power wheel 22 is rotated from the angular position shown in Fig. 2 to that shown in Fig. 1, which returns the arm 28ª and the truss-rod 31 to the position shown in Fig. 1.

It is obvious that there must be a loose connection between the front of the implement frame and the tractor or draft means, designated by A in Fig. 1, in order to permit free movement of the implement over uneven ground, and to permit a limited relative vertical movement between the front of the frame and the draft means. In the raising action of the frame the front end is first inclined upwardly until the loose connection of the truss is taken up and until the upward movement of the front end of the frame reaches its limit; the continued action of the wheel-operated means causes the rear end of the implement frame to be raised about the axis of the power wheel 21 as a fulcrum, and the front end of the frame to be depressed.

Changes may be made without departing from the spirit and scope of the invention.

I claim:

1. A power lift agricultural implement comprising a frame and an earth-turning body rigidly mounted therein, a ground wheel at the rear of said body, a power wheel and a furrow wheel at opposite sides of the frame, a crank shaft mounting for each of these opposite wheels, means for relatively adjusting said opposite wheels to predetermine the depth of cut of said body, a hitch-bar to which the front of the frame is pivoted, means operated by said power wheel for raising the front end of the frame relatively to the front wheels, a lever connected to the crank of the power wheel and rotatable with it, a brace projecting from the hitch-bar, a truss-rod connected to one end of said lever and slidable for a predetermined distance in the brace, and means yieldingly connecting the other end of the lever with the frame, the lever, rod, and brace forming a truss between the frame and hitch-bar to elevate the rear of the frame and to remove the ground wheel and the earth-turning body from the ground after the front end of the frame has been upwardly inclined by the power wheel.

2. In a power lift agricultural implement, a wheel supporting the frame, a hitch-bar to which the front of the frame is pivoted, a crank shaft mounting for one of the wheels, power mechanism operated by the rotation of the wheel for raising and lowering the frame and thereupon rotating the crank in the frame, a brace supported by the hitch-bar, a lever connected to the crank shaft and rotated therewith, a yielding connection between one end of the lever and the frame, a truss-bar connected to the other end of the lever, a swivel block supported by the brace through which the bar extends, and a member adjustable on the end of the bar to limit the movement of the bar through the swivel block in a direction therewith from the brace.

3. In a power lift agricultural implement, a hitch-bar provided with a brace and a perforated swivel block carried thereby; a frame pivoted to the bar; means including a crank shaft rotatable in the frame and a power wheel supported by the crank thereof upon which the frame is carried; a lever connected to the rotatable portion of the crank shaft, a yielding connection between the upper end of the lever and frame, a truss-bar connected to the other end of the lever and extending through the swivel block with an adjustable nut at the end of the bar for limiting the movement of the bar through the block; and power-operated mechanism carried by the wheel operative to raise the front end of the frame, thereby rotating the crank shaft in the frame and inclining the front end of the frame with respect to the hitch-bar, thereupon forming a truss when the nut of the truss-bar engages the swivel block, between the hitch-bar and the lever which causes the connection between the frame and the hitch-bar to be straightened out, thereby raising the rear end of the frame at an angle.

4. In a plow, the combination of draft means, a frame, a plow body rigid therewith, a ground wheel supporting the front end of said frame, power lift mechanism for lifting the front end of said frame relative to said ground wheel and thereby to cause an upward tilting of the plow body, a flexible draft connection for permitting a sufficient amount of such tilting to enable the plow body as an incident to its forward travel to assume a position in which the ground offers comparatively little resistance to the bodily elevation of the plow body, and a fulcrum on said draft means in advance of said wheel and co-operating with said frame to thereafter cause said frame as an incident to further movement of said lift mechanism to swing upwardly about said fulcrum so as to raise the rear end of said frame and thereby elevate the plow body above the ground.

5. A power lift agricultural implement comprising a hitch bar, means adjacent the front end of said hitch bar serving as a fulcrum therefor, a frame connected to the rear end of said hitch bar, a plow body secured to said frame, a ground wheel adjacent the front end of said frame, power lift mechanism operable to initially raise the front end of said frame relative to said ground wheel and thereby effect upward tilting of said plow body and whereby the latter will guide itself towards the surface of the ground as the implement moves forward, there being sufficient flexibility in the connection of said hitch bar and frame to enable said plow body to assume a position adjacent the surface, where comparatively little ground resistance to elevation thereof remains, without substantially raising the rear end of said frame, and means for thereafter limiting said flexibility whereby further movement of said lift mechanism will swing said bar and frame as a unit upwardly about said fulcrum and thereby raise the rear end of the frame and consequently elevate said plow body above the ground.

6. A power lift agricultural implement comprising a hitch bar maintained at substantially constant height at its front end, a frame pivotally connected to the rear end of said hitch bar, a plow body secured to said frame, a ground wheel supporting said frame adjacent its front end, lifting mechanism for raising said frame, said pivotal connection permitting relative movement of said hitch bar and frame to permit initial raising of the front end only of said frame and consequent upward tilting of said plow body sufficiently so that when the implement is drawn forward said plow body will be guided towards the surface of the ground to a position where the ground remaining thereover offers comparatively little resistance to bodily elevation of said plow body, and means for causing said pivotal connection to thereafter become rigid and thereby cause further movement of said lifting mechanism to swing said frame and hitch bar upwardly as a unit about the front end of said hitch bar whereby said plow body will be elevated above the ground.

ROBERT C. CAUGHEY.